US006783100B1

(12) United States Patent
Cinq-Mars (10) Patent No.: US 6,783,100 B1
(45) Date of Patent: Aug. 31, 2004

(54) FLUTED LINK FOR WIRING

(75) Inventor: Alain Cinq-Mars, Quebec (CA)

(73) Assignee: Her Majesty the Queen as Represented by the Minister of National Defence of Her Majesty's Canadian Government, Ottawa (CA)

( * ) Notice: Subject to any disclaimer, the term of this patent is extended or adjusted under 35 U.S.C. 154(b) by 0 days.

(21) Appl. No.: 10/388,464

(22) Filed: Mar. 17, 2003

(51) Int. Cl.[7] ................................................. F16L 3/00
(52) U.S. Cl. ............................ 248/49; 248/51; 248/65; 248/68.1
(58) Field of Search .......................... 248/51, 52, 68.1, 248/49, 65

(56) References Cited

U.S. PATENT DOCUMENTS

| 2,082,099 A | 6/1937 | Cruser |
| 5,601,260 A | 2/1997 | Shinohara et al. |
| 5,743,497 A | 4/1998 | Michael |

*Primary Examiner*—Leslie A. Braun
*Assistant Examiner*—Amy J. Sterling
(74) *Attorney, Agent, or Firm*—Stites & Harbison PLLC; Ross F. Hunt, Jr.

(57) ABSTRACT

A support for electrical conductors, optical fibers, gas tubes, etc., having an elongated base, portions at each end of the base extending towards the front of the support, each end portion containing an aperture oriented perpendicular to the length of that base and lying parallel to the base. The support has a plurality of U-shaped recesses with openings facing the front to form a fluted link. A plurality of the fluted links can be arranged into a flexible carrier belt by inserting wires through the apertures to hold the fluted links adjacent to each other with adjacent ones facing in opposite directions. During assembly of the carrier belt, the conductors, fibers or tubes, etc., to be supported are fitted into appropriate U-shaped recesses that provide support for those items. The flexible carrier belt provides conductor connections between a stationary part and a rotatable part of an apparatus.

6 Claims, 6 Drawing Sheets

FLUTED LINK FOR WIRING

FIELD OF THE INVENTION

The present invention relates to supports for conductors or similar items that can be assembled, with the conductors, into a flexible chain-like carrier belt and, in particular, to a carrier belt to provide conductor connections between a rotatable apparatus and a stationary part.

BACKGROUND OF THE INVENTION

A number of types of supports for electrical conductors exist such as those described in U.S. Pat. No. 2,082,099 by V. I. Cruser where electrical conductors are connected to a plurality of electrical devices, the conductors being taken from a cable at a plurality of points. One cable support shown and described in this US Patent has a curved shaped supporting bar for the cable with spaced wire loops extending from upper edges of the bar. The wire loops have rounded surfaces to prevent any tearing or cutting of the insulated covering on the conductors. The spaced loops have openings through which conductors can be removed from the cable at various locations and connected to separate electrical devices. The rounded edges and curved support bar on which the cable rests prevent damage to the insulated covering on the conductors.

Other types of supports for retaining a cable or coil are described by K. Shinohara et al in U.S. Pat. No. 5,601,260 and, in particular, supporting clamps to retain degaussing coils around the outer periphery of a cathode-ray tube. Most of the coil clamps described by K. Shinohara et al have a flexible, elongated, thin plate-shaped main body or frame with an anchor portion at one end that can be press fitted into a mounting hole, such as one located in a bracket of a cathode-ray tube. These types of coil clamps can be integrally formed of a flexible material such as a resin. One of the clamps described in U.S. Pat. No. 5,601,260 has two spaced U-shaped protrusions on the elongated frame which form retaining spaces in which degaussing coils can be supported and retained. The degaussing coils are held in each retaining space by a flexible pressing plate extending from the frame and which is located at an opening of the U-shaped protrusions.

U.S. Pat. No. 5,743,497 by Douglas C. Michael describes another support, in this case an installation strip for installing electrical wires to speed up that installation and then act as a support for the electrical wires. The strips include a base with an elongated top surface that can be mounted on a supporting structural element. A plurality of spaced retention hooks for electrical wires extend outwardly from the elongated base. Each retention hook includes a first leg extending outwardly from the base, a second leg extending out from the end of the first leg and parallel to the base with a detent angled downwardly from the end of the second leg to capture and retain an electrical wire in the space between the second leg and the base. The entire installation strip can be formed of a suitable plastic material.

The previously described supports for electrical wires are all designed to retain the wires stationary and are not suitable to connect the wires to moveable equipment since this would result in bending the wires that might cause damage to the insulation on those wires.

OBJECT OF THE PRESENT INVENTION

It is an object of the present invention to provide fluted links to hold electrical conductors, optical fiber cables or other conductors securely without any damage to the conductors or cables.

It is a further object of the present invention to provide a flexible chain-like carrier belt made of fluted links to hold electrical conductors, optical fibers or other conductors securely without any damage to the conductors or fibers when the belt is moved in order to supply connections to rotating or moveable equipment.

A support for transfer lines, according to one embodiment of the invention, comprises at least one fluted link having an elongated base, portions at each end of the base extending towards a front of the link, each end portion containing an aperture oriented perpendicular to the length of the elongated base, the apertures extending through the thickness of the end portions, the fluted link having a plurality of U-shaped recesses with openings facing towards said front, the U-shaped recesses extend through the thickness of the link from one side to the other and have dimensions that allow the transfer lines to be fitted into the U-shaped recesses, the U-shaped recesses being parallel to said apertures.

A support for transfer lines, according to another embodiment of the invention, comprises a carrier belt formed of a plurality of fluted links having an elongated base, portions at each end of the base extending towards a front of the link, each end portion containing an aperture oriented perpendicular to the length of the elongated base, the apertures extending through the thickness of the end portions, the fluted link having a plurality of U-shaped recesses with openings facing towards said front, the U-shaped recesses extend through the thickness of the link from one side to the other and have dimensions that allow the transfer lines to be fitted into the U-shaped recesses, the U-shaped recesses being parallel to said apertures, a wire extending through adjacent apertures in both end portions, the wires holding the fluted links together forming said carrier belt, most adjacent links in the carrier belt facing in opposite directions with the transfer lines being fitted into said U-shaped recesses.

BRIEF DESCRIPTION OF THE DRAWINGS

Embodiments of the present invention will now be described in more detail with reference to the accompanying drawings, wherein.

DESCRIPTION OF THE PREFERRED EMBODIMENTS

Various types of supports for electrical conductors and/or optical fibers exists which are designed to hold those conductors and/or optical fibers stationary. These are suitable for stationary equipment but in some apparatus it is necessary to supply a rotatable section with electricity and/or information transfer lines and to link those lines between the rotatable part and a fixed part of the apparatus. These lines can be delicate, particularly optical fiber lines, and many lines may be required so that rotatable mechanical or sliding contacting connections are not suitable.

Figure 1A:
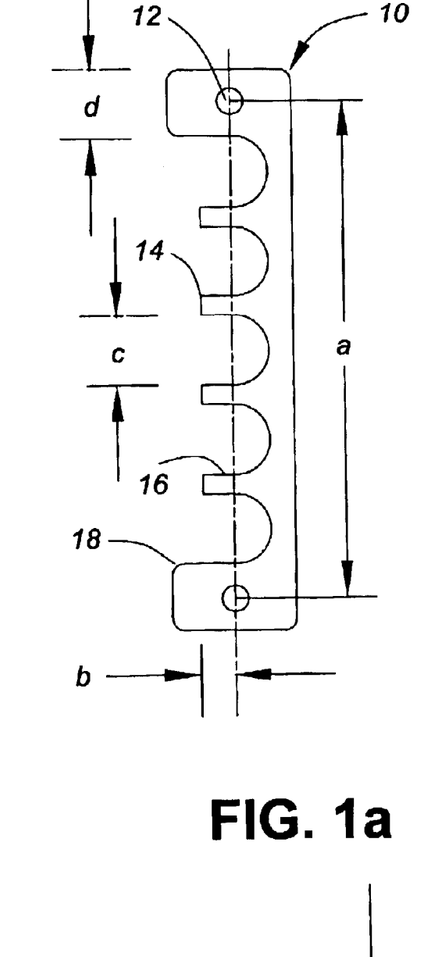
FIG. 1a is a side view of a fluted plastic link according to one embodiment of the present invention with FIG. 1b being a front view and FIG. 1c an end view of that link.
Figure 1B:
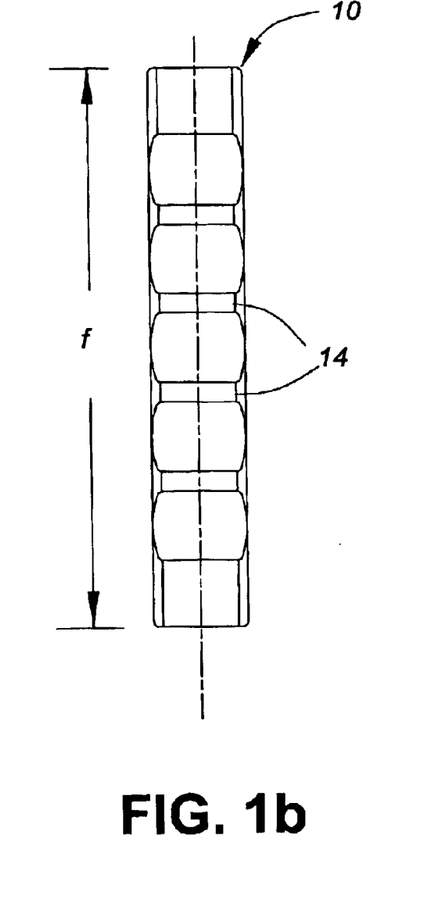
Figure 1C:
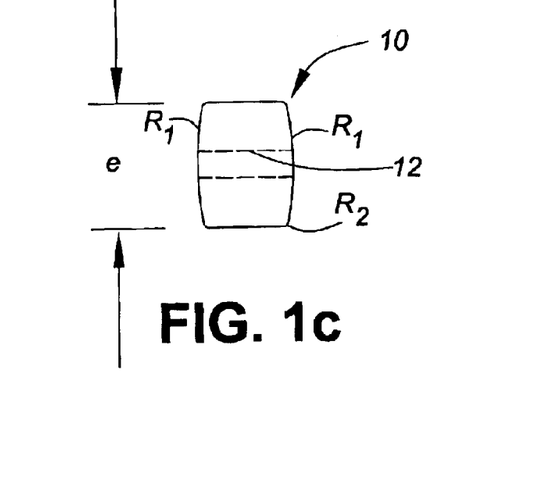
Figure 2:
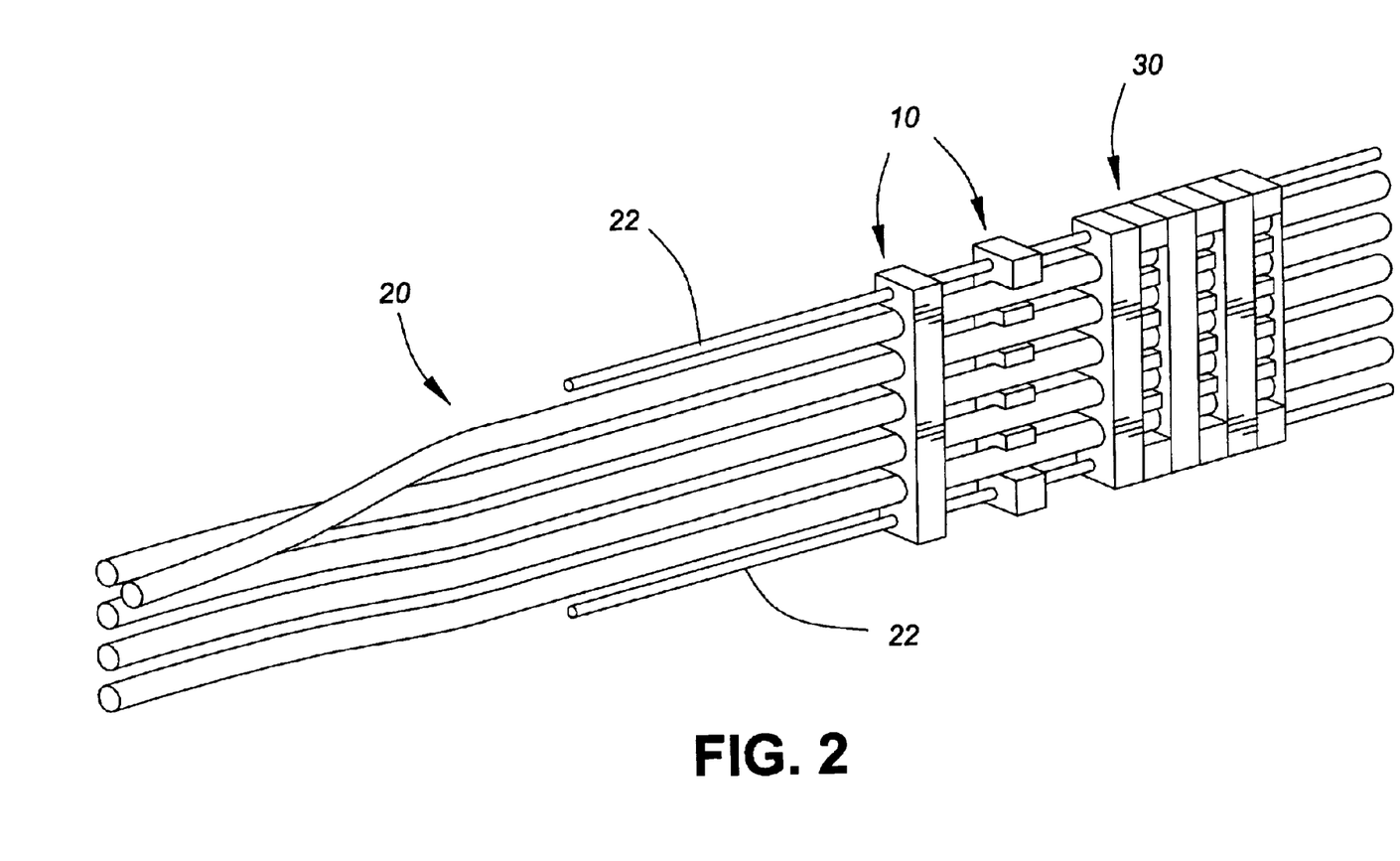
FIG. 2 is a perspective view that illustrates a flexible chain-like carrier belt being made up of the fluted plastic links shown in FIGS. 1a, b and c as the links are assembled with transfer lines such as electrical conductors, tubes or fiber optical cables.

The present invention provides a flexible support for electrical conductors and/or information transfer lines between a stationary part of an apparatus and a rotatable part. A fluted plastic link 10, according to one embodiment of the invention, is illustrated in FIGS. 1a, b and c with FIG. 2 illustrating a plurality of the plastic links 10 being assembled into a carrier belt 30. That carrier belt 30 is flexible and provides support for electrical conductors and/or information transfer lines that connect a stationary part of an apparatus to a rotatable part. FIG. 1a is a side view of a fluted plastic link 10 (FIG. 1b being a front view and 1c an end view) according to one embodiment of the present invention. The fluted plastic link 10 has a flat base portion, a number of links being shown in perspective in FIG. 2, and end portions 18 with a number of U-shaped recesses 16, opposite the base, being located between end portions 18. The U-shaped recesses 16 are designed to hold and support electrical conductors 20 or information transfer lines (see FIG. 2) and their sizes and number can be varied to accommodate different sizes and number of conductors and/or information transfer lines such as, as shown in FIG. 2, optical fibers 20. In this particular embodiment, as best shown in FIG. 1a, there are five U-shaped recesses, each recess having an open end with a width "c" of 0.275". The end portions 18 extend farther from the back of the base than the fronts 14 of the U-shaped recesses 16. Each end portion contain an aperture 12 (see FIGS. 1a and 1c) through which stainless steel wires 22 (see FIG. 2) can be inserted to form a carrier belt 30 from a plurality of links 10. The sides of the links 10 containing openings to aperture 12 are rounded and have a radius $R_1$ of 1" (see FIG. 1c). A partially assembled carrier belt 30 is illustrated in FIG. 2. In the particular link illustrated in FIGS. 1a, b, and c, the apertures 12 are spaced apart by a distance "a" of 1.875" and the apertures have a diameter of 0.90". The distance between the centers of apertures 12 and tops 14 of the U-shaped recesses 16 is 0.14". The total length of the link 10 is 2.125" and the thickness is 0.38" with all outer edges, such as $R_2$, being rounded with a radius of 1/32". These fluted plastic links 10 are formed of high density polyethylene but they could be manufactured from other suitable types of plastic material. The stainless steel wire 22 could be formed of other material such as a nylon cable.

Figure 5:
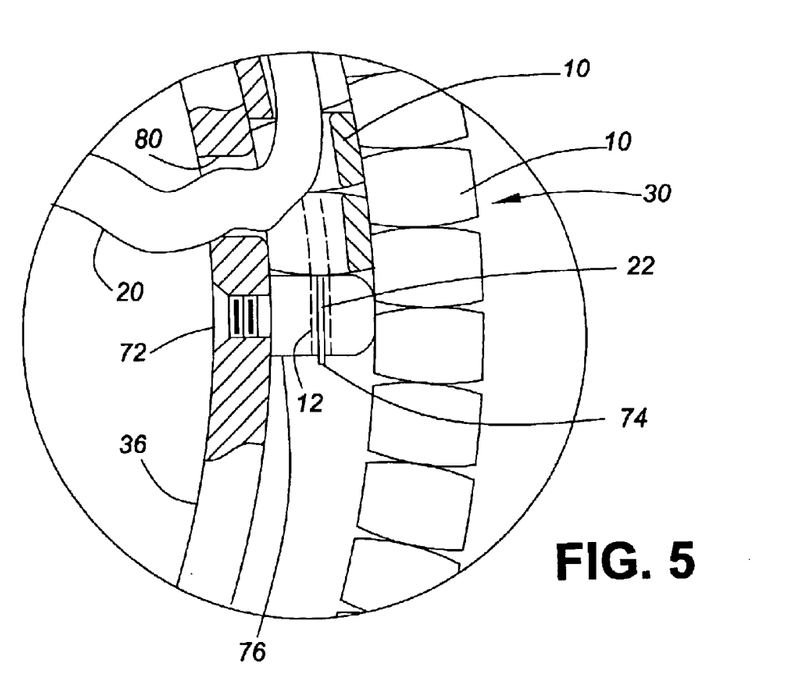
FIG. 5 is a top, partially cross-sectional, view illustrating a fastener for the carrier belt where it is attached to the central rotatable spool.
Figure 6:
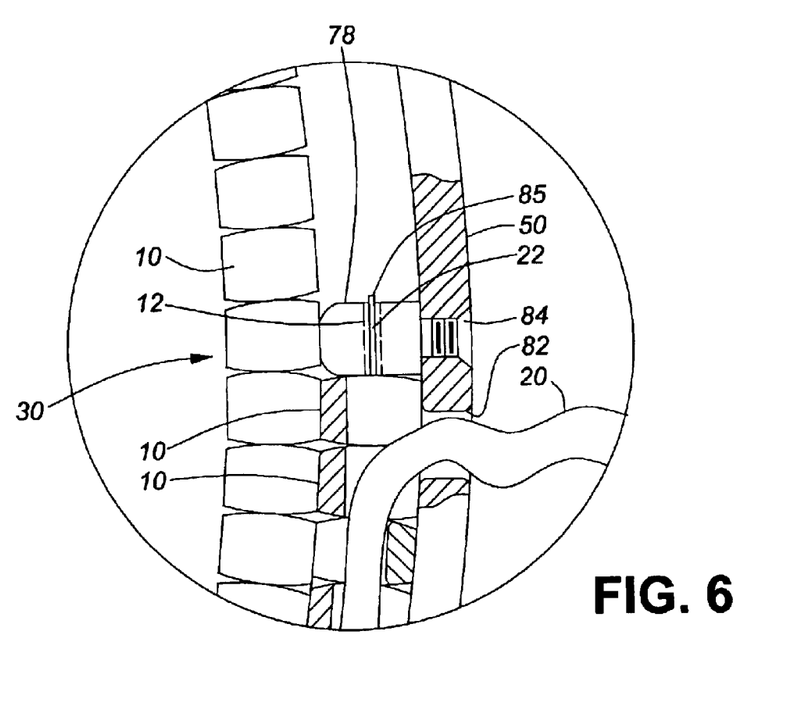
FIG. 6 is a top, partially cross-sectional, view illustrating a fastener for the carrier belt where it is attached to external circular shell of a stationary portion of the holder.

FIG. 2 is a perspective view that illustrated a carrier belt 30 being assembled from a number of fluted links 10 with a number of conductors 20, five optical fiber conductors being shown in this figure, being located in the U-shaped recesses 16 in the links 10. Two steel wires 22 run through apertures 12 near the outer ends 18 (see FIG. 1a) of links 10, one wire 22 through an aperture 12 at one end of each link 10 and the other through an aperture 12 at the opposite end of each link 10, to form a flexible chain-link carrier belt 30. The links 10 in carrier belt 30 are adjacent to each other when fully assembled (see FIG. 3) and are alternately positioned facing in opposite directions, one after the other, to keep conductors 20 in place in recesses 16 but without sticking to them. The U-shaped recesses 16 of adjacent links 10 face in opposite direction for most of the length of belt 30. The rounded sides of links 10 containing openings to apertures 12 allow the links to roll, to a limited extent, against adjacent sides resulting in the chain-link carrier belt 30 being flexible. The two steel wires 22 are spring loaded and are held at the extremities of belt 30 by specially designed end terminal blocks 76 (see FIG. 5) or 78 (see FIG. 6) attached to an inner wall 36 of a rotatable spool 46 or outer wall 50 of a stationary shell 8B, respectively.

Figure 7A:
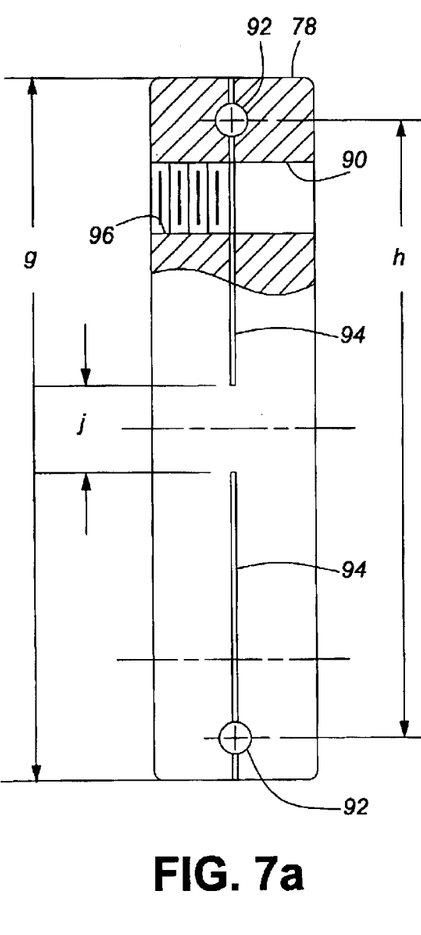
FIG. 7a is a partially cross-sectional side view of an end terminal clamp for the carrier belt and FIG. 7b is an end view of that end terminal clamp which are used to fasten the carrier belt to the holder shown in FIGS. 3 and 4.
Figure 7B:
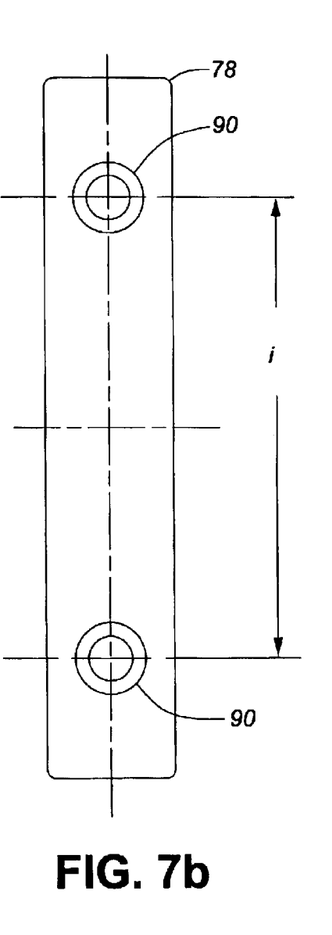

One end terminal block 78 is shown in a partial cross-sectional view in FIG. 7a and end view in FIG. 7b. End terminal block 76 is the same as 78. Each have two openings 90 for two bolts 84 (bolts 72 for end block 76 shown in FIG. 5) that fasten the end blocks to the inner and outer walls through openings in those walls. The openings 90 have a threaded portion for those bolts at the ends remote from the walls for holding the bolts that fasten the end blocks to the walls. Openings 92 extend through the end blocks at each end at right angle to openings 90 and these opening 92 are slightly larger than the wires 22 which are threaded through the openings 92. Slots 94 extend from each end of the end blocks 78 or 76 through openings 92 and openings 90 and part way to the center of the end blocks.

Before tightening the bolts 72 and 84 that fasten the end blocks to the inner and outer wall, the wires 22 are threaded through the openings 92 and the play in the belt 30 is removed by hand by pulling on wires 22 and then tightening the bolts 72 and 84. The tightening of bolts 72 and 84 causes outer ends of slots 94 to move towards each other and clamp the wires 22 in openings 92. A small amount of play in belt 30 is acceptable and this would not impede the mechanism. Once the wires 22 are clamped in openings 92, the remaining ends of wires 22 are cut with the belt 30 being clamped at each end by the end blocks 78 and 76.

The two spring steel wires are tough and resistant to flexion causing the carrier belt to unwind when it is wound into a spiral shape. The belt 30 winds or unwinds itself in a spiral around a rotatable spool 46 (see FIG. 4), the spiral being best illustrated in the top, partially cut away, view in FIG. 3 of the connector mechanism 90. An external circular shell 88 with a bottom 66 (see FIG. 4) supports the spirally wound belt 30 (see FIG. 3) and a top cover 44 (see FIG. 4) is located above the spiral belt 30. The extremities of the belt 30 are fixed and the conductors 20 are not bent or twisted with respect to spool 46 or shell 88 (see FIG. 4) as belt 30 remains essentially perpendicular between cover 44 and bottom 66, the only bending being in a plane parallel to cover 44 and bottom 66 and between the outer diameter of stationary shell 88 and the inner diameter of shell 88.

Figure 3:
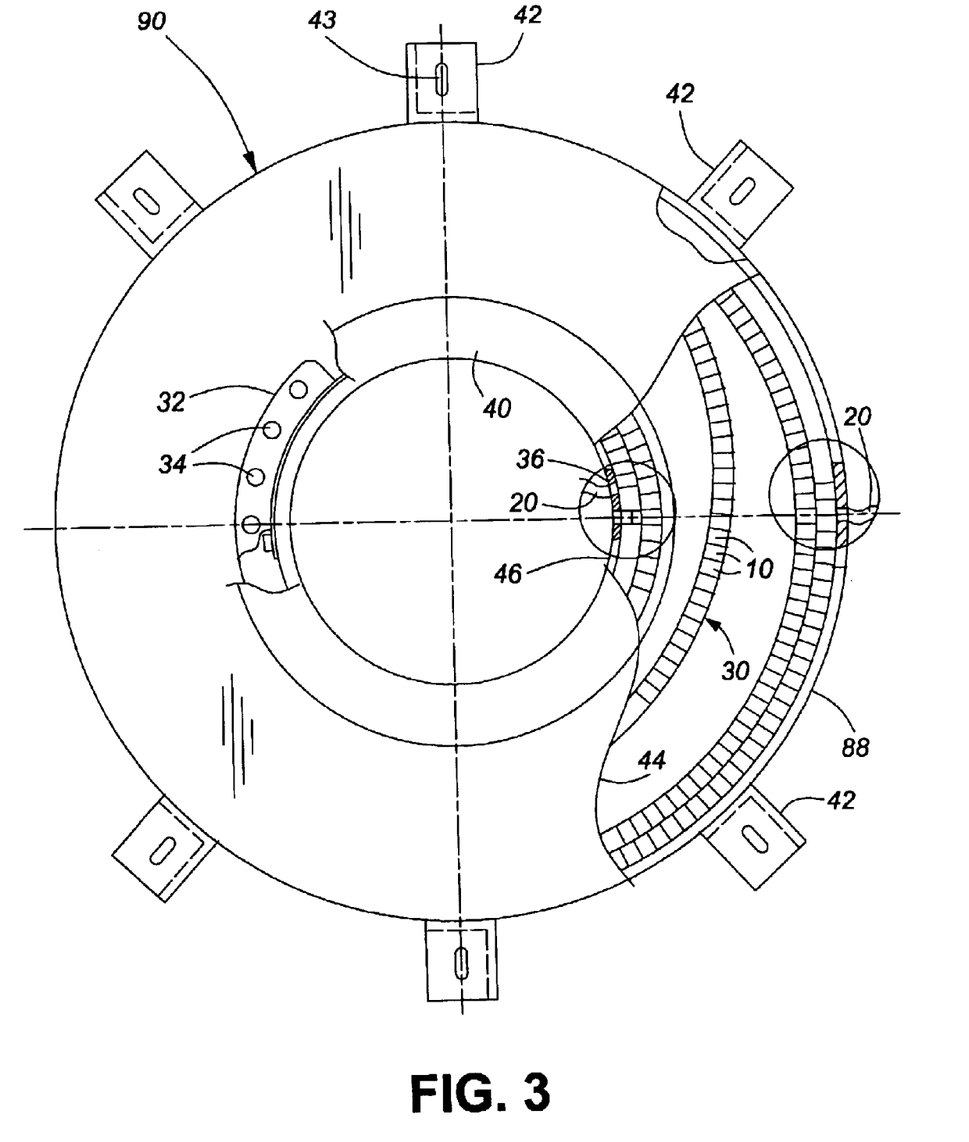
FIG. 3 is a top view, partially cut away, of a holder for a spirally wound carrier belt illustrated in FIG. 2, the holder having central rotatable spool.

The steel wires 22 (see FIG. 2) were straight before the carrier belt 30 was wound into a spiral as illustrated in FIG. 3 and then placed in shell 88, this providing a slingshot effect that enables the expanding spiral to free itself from rotatable spool 46. Once wound on itself, the spiral belt tends to have its radius increased by unwinding but is prevented from doing so by shell 88. The mechanical force required to wind the spiral when the system is operated by rotating the spool 46 is low. Excessive resistance can be neutralized by setting two spirals in opposition to each other in distinct and superposed shells. In that case, the conductors could be rerouted towards the two belts whose height is proportionally reduced.

A complete connector mechanism 90, according to one embodiment of the invention, will now be described with reference to FIGS. 3, 4, 5 and 6. A circular arrangement of brackets 42 shown in the top view of FIG. 3 (three being shown in the side view of FIG. 4) support, align and position all non-rotating parts of mechanism 90. In this embodiment, the non-rotating circular shell 88 is connected to the brackets 42 by bolts 56 as shown at the central bracket in FIG. 4 and the tops of the brackets connected to other apparatus by bolts extending through slots 43 in the tops of the brackets (one bolt 54 being shown at the central bracket in FIG. 4).

Figure 4:
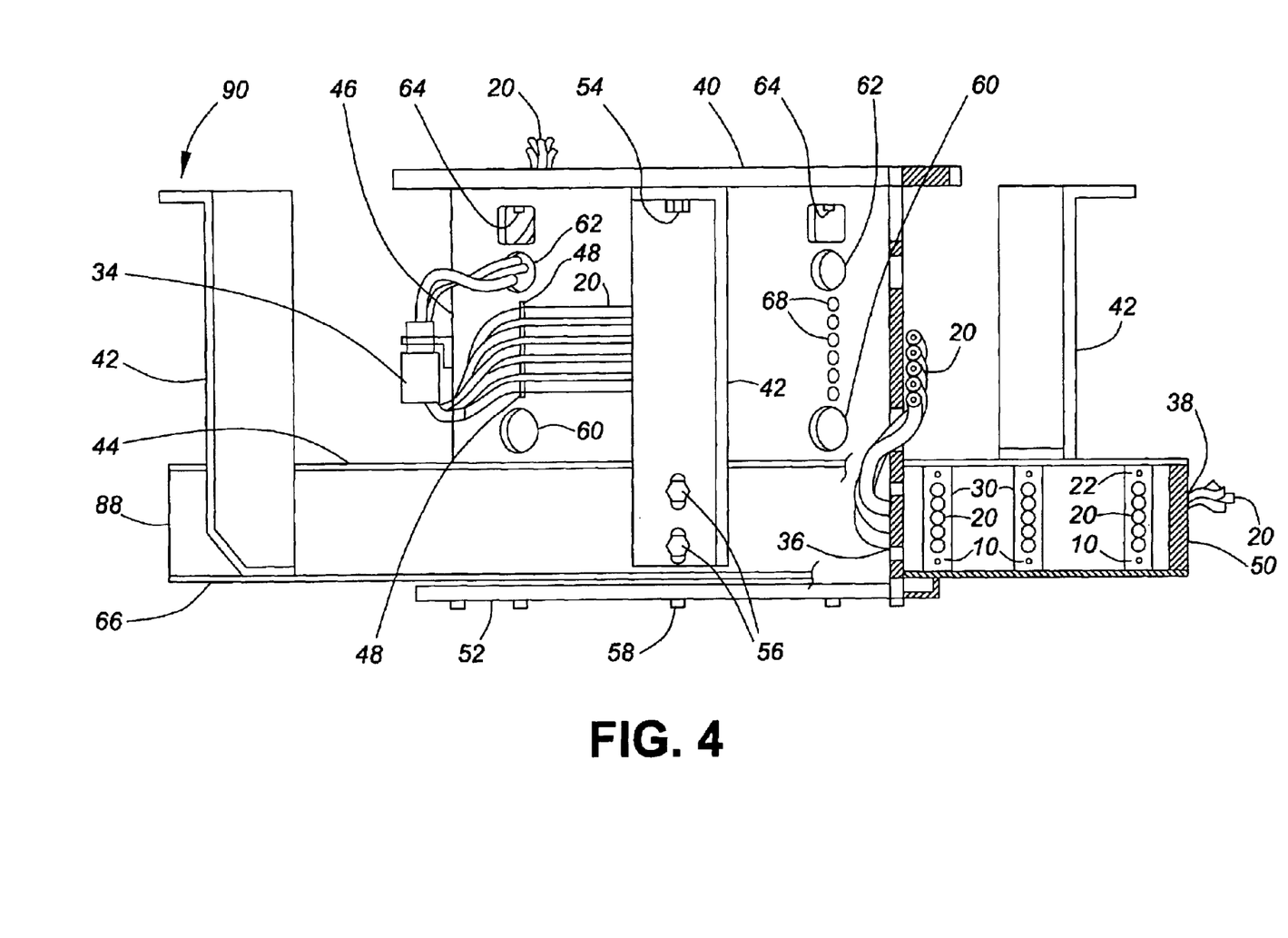
FIG. 4 is a partially cross-sectional side view of the holder illustrated in FIG. 3.

A rotatable hollow spool 46 shown in FIG. 4 with an annular cover 40 and bottom 52 is rotatably supported and extends through a central opening (not shown) within shell 88. The outer wall of spool contain a number of vertically aligned openings 60, 62 and 64 of various sizes arranged around the circumference of spool 46. The various sizes of the openings allows various sizes and number of conductors and/or information transfer lines to be passed through selected openings. Those conductors or transfer lines could include items such insulated electric wires, information links, optical fibers, gas tubes or tubes for supplying liquids. These are generally referred to herein as "transfer lines". In this particular embodiment, a number of optical fibers 20 from a rotatable section of a LIDAR scanner are threaded through an opening (not shown) in annular cover 40 and out through one opening 62 (see FIG. 4) of the rotatable spool 46 to a number of connectors 34 in a frame 32 (see FIGS. 3 and 4) attached to the outer wall of spool 46. Optical fibers 20 from the connectors 34 are wound around spool 46 and supported by nylon straps 48 connected to spool 46 by a number of small openings 68 in the wall of spool 46. The small openings 68, in this case, are vertically aligned with the other openings 60, 62 and 64 and are large in number to allow for different configurations. The nylon straps 48 are each passed through two openings 68 and the ends attached together keeping the cables tight on the spool 46 between those two openings 68. There are 6 openings 68 for 5 cables (optical fibers 20) that form belt 30 and 5 nylon straps for each row of openings.

The optical fibers 20 supported on spool 46 by nylon straps 48 enter the non-rotating circular shell 88 through an opening in its inner wall 36 where they are supported in the spirally wound carrier belt 30 (see FIG. 3) which is shown in cross-section in FIG. 4. This is best illustrated in an enlarged partially cross-sectional top view in FIG. 5 where an optical fiber 20 (five being vertically aligned) enters through an opening 80 of inner wall 36 and into carrier belt 30. The first two adjacent fluted links 10 at this end of carrier belt 30 are both facing in the same direction, rather than alternating, with their U-shaped recesses facing opening 80. This allows the optical fibers 20 to enter the interior of carrier belt 30 from the opening formed by the two U-shaped recesses where they are supported in the U-shaped recesses of other fluted links 10 in belt 30, those U-shaped recesses alternately facing opposite directions. The two steel wires 22 (one being shown in FIG. 5) at this end of carrier belt 30 are attached to an end terminal block 76, block 76 being attached to inner wall 36 by two bolts 72 that extend through two openings (90 as shown in FIGS. 7a and 7b) in block 76 which is similar to block 78 shown in FIGS. 7a and 7b.

The optical fibers 20 in carrier belt 30 exit the shell 88 through an opening in the outer wall 50 at 38 as shown in FIG. 4. This is best illustrated in an enlarged partially cross-sectional top view of FIG. 6 where an optical fiber 20 (five being vertically aligned in carrier belt 30) exits through an opening 82 of outer wall 50. The last two adjacent fluted links 10 at this end of carrier belt 30 are facing in the same direction, rather than alternating, with their U-shaped recesses facing opening 82. This allows the fibers 20 to leave the spirally wound carrier belt 30 and the stationary shell 88 through opening 82 so they can be connected to recording and/or display equipment. The two steel wires 22 (one being shown in FIG. 6) at this end of carrier belt are attached to an end terminal block 78, block 78 being attached to outer wall 50 by two bolts 84 extending through two openings 90 in terminal block 78 (see FIG. 7a). This arrangement does not allow for continuous rotation of spool 46 but a few revolutions may be achieved depending on particular configurations.

Various modifications may be made to the preferred embodiment without departing from the spirit and scope of the invention as defined in the appended claims.

What is claimed is:

1. A support for transfer lines comprising a carrier belt having a plurality of fluted links formed of plastic and having outer edges all of which are rounded, said links having an elongated base, portions at each end of the base extending towards a front of the link, each end portion containing an aperture oriented perpendicular to the length of the elongated base, the apertures extending through the thickness of the end portions, the fluted links having a plurality of U-shaped recesses with openings facing towards said front, the U-shaped recesses extending through the thickness of the link from one side to the other and having dimensions that allow the transfer lines to be fitted into the U-shaped recesses and, the U-shaped recesses being parallel to said apertures, the transfer lines comprising ones selected from the group of electrical conductors, optical fibers, gas tubes or tubes for supplying liquids, the end portions extending further from the base than top edges of the U-shaped recesses, and said apertures being located in said end portions about mid-way between bottoms of the U-shaped recesses and said top edges, with a wire of a plurality of wires extending through adjacent apertures in both end portions, the wires holding the fluted links together forming said carrier belt, most adjacent links in the carrier belt facing in opposite directions with the transfer lines being fitted into said U-shaped recesses.

2. A support for transfer lines as defined in claim 1, wherein sides of the fluted links containing said apertures form a carrier belt that is flexible in a direction perpendicular to the elongated bases of the links.

3. A support for transfer lines as defined in claim 2, wherein two adjacent fluted links at each end of the carrier belt have their U-shaped recesses facing in the same direction.

4. A support for transfer lines comprising a carrier belt having a plurality of fluted links, said fluted links each having an elongated base, and end portions at each end of the base extending towards a front of the link, each end portion containing an aperture oriented perpendicular to the length of the elongated base, the apertures extending through the thickness of the end portions, each fluted link having a plurality of U-shaped recesses with openings facing towards said front, the U-shaped recesses extending through the thickness of the link from one side to the other and having dimensions that allow the transfer lines to be fitted into the U-shaped recesses, and the U-shaped recesses being parallel to said apertures, and a plurality of wires, each wire extending through adjacent apertures in both end portions of said links, the wires holding the fluted links together forming said carrier belt, and the most adjacent links in the carrier belt facing in opposite directions with the transfer lines being fitted into said U-shaped recesses.

5. A support for transfer lines as defined in claim 4, wherein sides of the fluted links containing said apertures form a carrier belt that is flexible in a direction perpendicular to the elongated bases of the links.

6. A support for transfer lines as defined in claim 5, wherein two adjacent fluted links at each end of the carrier belt have their U-shaped recesses facing in the same direction.

* * * * *